United States Patent [19]

Onoda

[11] Patent Number: 4,758,102
[45] Date of Patent: Jul. 19, 1988

[54] PEN-RECORDING APPARATUS CAPABLE OF ERASING WRITTEN CHARACTERS

[75] Inventor: Hiroshi Onoda, Kariya, Japan

[73] Assignee: Brother Kogyo Kabushiki Kaisha, Aichi, Japan

[21] Appl. No.: 845,463

[22] Filed: Mar. 28, 1986

[30] Foreign Application Priority Data

Mar. 29, 1985 [JP] Japan .................. 60-67328

[51] Int. Cl.$^4$ .................. B41J 29/28; B41J 29/36
[52] U.S. Cl. .................. 400/18; 400/210; 400/304; 400/697; 346/49; 346/139 R
[58] Field of Search .................. 400/17, 18, 19, 210, 400/304, 695, 696, 697, 697.1; 346/49, 139 R, 140; 33/18.1, 18.2

[56] References Cited

U.S. PATENT DOCUMENTS

| | | | |
|---|---|---|---|
| 4,150,902 | 4/1979 | Brescia | 400/18 X |
| 4,307,971 | 12/1981 | Kane, III et al. | 400/304 X |
| 4,388,005 | 6/1983 | Wehking et al. | 400/210 X |
| 4,504,838 | 3/1985 | Tamai et al. | 346/139 R X |
| 4,517,576 | 5/1985 | Sugawara | 346/139 R |
| 4,577,982 | 3/1986 | Sasaki | 400/18 X |
| 4,607,263 | 8/1986 | Fujisawa et al. | 346/139 R |
| 4,607,265 | 8/1986 | Onoda et al. | 400/210 X |
| 4,611,215 | 9/1986 | Onoda | 346/49 |
| 4,627,748 | 12/1986 | Mizuno et al. | 400/17 |
| 4,642,779 | 2/1987 | Sawada | 400/18 X |
| 4,644,367 | 2/1987 | Onoda et al. | 400/18 X |

FOREIGN PATENT DOCUMENTS

| | | | |
|---|---|---|---|
| 0063675 | 5/1981 | Japan | 400/304 |
| 0137985 | 10/1981 | Japan | 400/697 |
| 0076282 | 5/1983 | Japan | 400/304 |
| 0097882 | 5/1985 | Japan | 400/18 |
| 0143965 | 7/1985 | Japan | 400/304 |
| 0147376 | 8/1985 | Japan | 400/304 |
| 0198282 | 10/1985 | Japan | 400/697 |
| 0198283 | 10/1985 | Japan | 400/304 |
| 0199661 | 10/1985 | Japan | 400/304 |
| 0253577 | 12/1985 | Japan | 400/697 |
| 528589 | 11/1940 | United Kingdom | 400/697 |

Primary Examiner—Ernest T. Wright, Jr.
Attorney, Agent, or Firm—Parkhurst & Oliff

[57] ABSTRACT

A recording device capable of writing a character on a sheet of paper with a writing ball-point pen according to a set of character pattern data which is stored in a pattern memory, and erasing a written character with an erasing ball-point pen with reliability, by means of (1) modifying the set of character pattern data into a corresponding set of erasing pattern data which permits each of the components of an erasing path of the erasing pen to be shifted from the written character in a selected one of a first and a second direction which are normal to a first and a second reference line intersecting with each other, the set of erasing pattern data causing the component of the erasing path to be shifted in the first direction if a segment of the written character corresponding to the component is positioned nearer to the first reference line than the second, or to be shifted in the second direction if the segment is positioned nearer to the second reference line, and (2) controlling movements of the erasing pen and the sheet of paper, according to the modified set of erasing pattern data, to trace the written character along the erasing path.

13 Claims, 12 Drawing Sheets

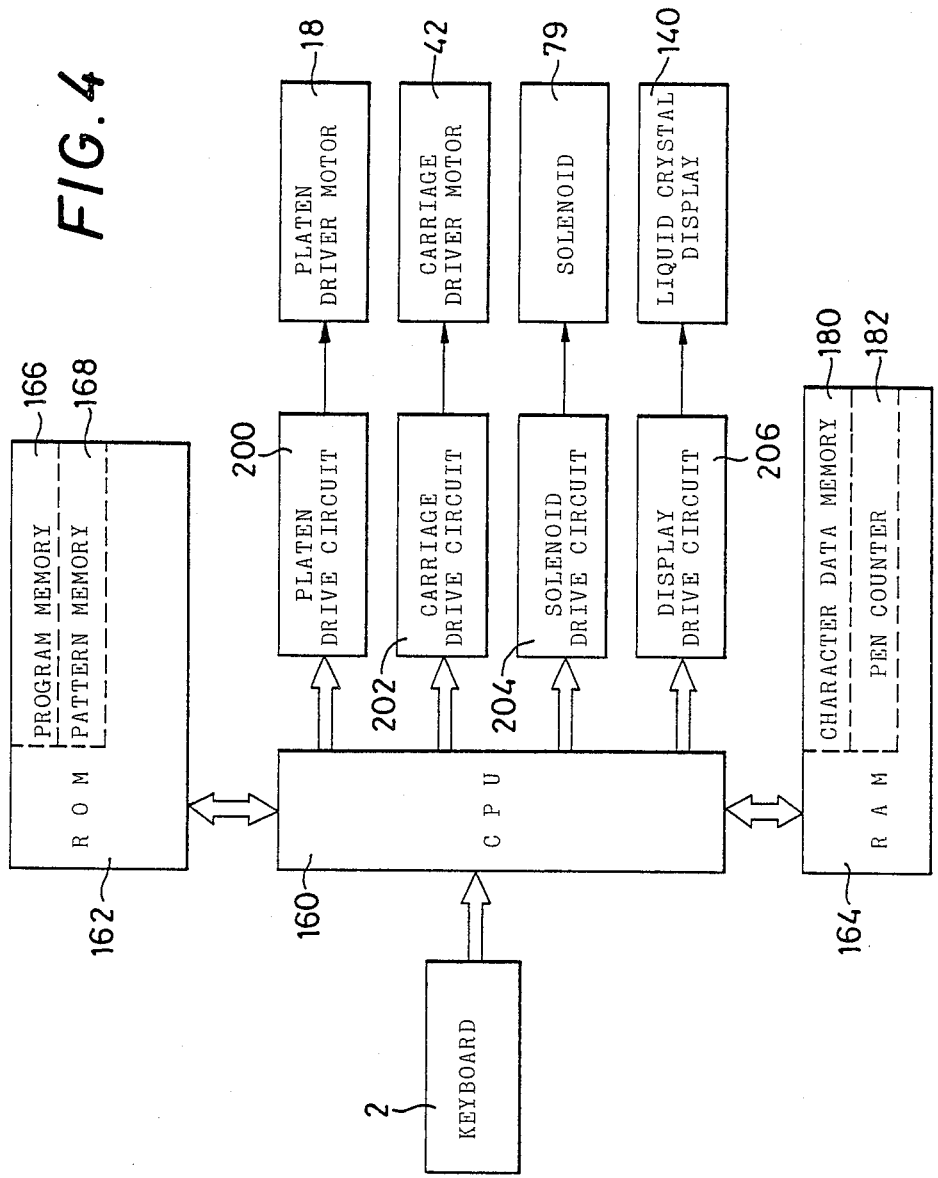

FIG.5(a)
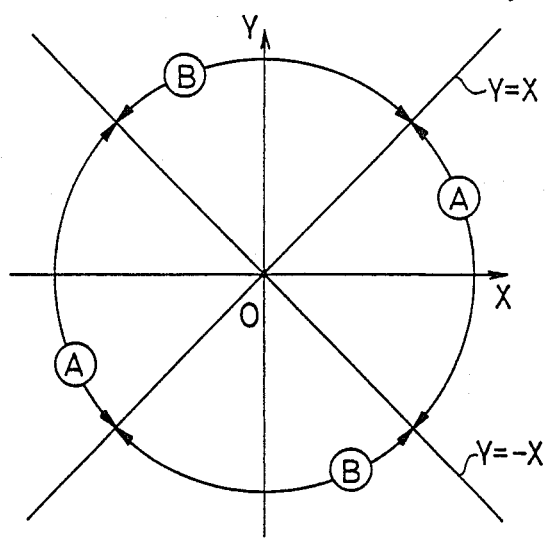
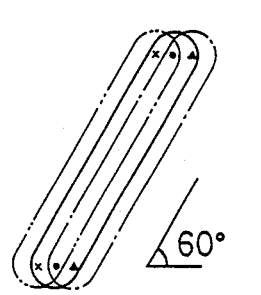
FIG.5(b)  FIG.5(c)
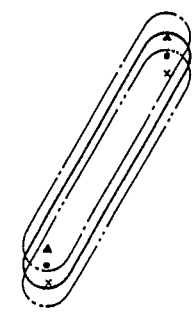
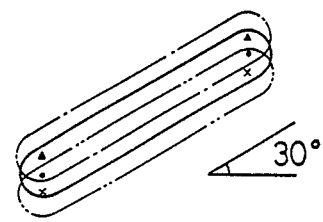
FIG.5(d)
FIG.5(e)
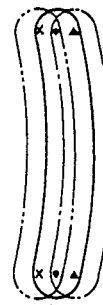
FIG.5(f)

Ig instrument, including: (A) a medium support member for supporting the recording medium; (B) a medium feeding means for feeding the recording medium in a selected one of opposite directions along a line of feed; (C) a carriage for supporting the writing and erasing instruments, the carriage being movable in a selected one of opposite directions perpendicular to the line of feed; (D) a carriage driving means for moving the carriage in the above directions; (E) an instrument selecting means for selectively bringing the writing and erasing instruments into an operative position in which a writing end of the writing instrument or an erasing end of the erasing instrument is located opposite to a surface of the recording medium; (F) an instrument driving means for moving the writing and erasing instruments into the operative position, between an advanced position and a retracted position, for contact and release of the writing and erasing ends with or from the surface of the recording medium; (G) a generator for producing character signals indicative of the characters, and an erasing signal commanding an erasing operation of the erasing instrument; (H) a pattern memory for storing sets of character pattern data representative of the characters; (I) a first control means, responsive to the character signal, for retrieving from the pattern memory a corresponding set of character pattern data, and controlling the operations of the medium feeding means, the carriage driving means, and the instrument driving means, according to the retrieved set of character pattern data, so as to write with the writing instrument the corresponding character on the recording medium; and (J) a second control means, responsive to the erasing signal produced after the character has been written, for retrieving from the pattern memory the set of character pattern data representative of the character, the second control means modifying the retrieved set of character pattern data into a corresponding set of erasing pattern data which permits each of the components of an erasing path of the erasing instrument to be shifted from the character in a selected one of a first and a second direction which are normal to a first and a second reference line, respectively, the first and second reference lines intersecting each other, the set of erasing pattern data causing the component of the erasing path to be shifted in the first direction if a segment of the character corresponding to the component is positioned nearer to the first reference line than to the second reference line, or to be shifted in the second direction if the segment is positioned nearer to the second reference line than to the first reference line, the second control means controlling the operations of the medium feeding means, the carriage driving means, and the instrument driving means, according to the set of erasing pattern data, so as to trace the character along the erasing path with the erasing instrument.

In the recording apparatus constructed as described above, the area that is traced with the erasing instrument is broadened as compared with a conventional recording device, and overlaps the area occupied by the written character while providing a margin around the character. Therefore, even in the case where the erasing instrument is located out of the precise operative position for erasing the character because of a positioning error of the erasing pen with respect to the character, the apparatus can effect the erasing operation with reliability.

PEN-RECORDING APPARATUS CAPABLE OF ERASING WRITTEN CHARACTERS

BACKGROUND OF THE INVENTION

The present invention relates to a recording apparatus capable of writing characters with a writing pen and erasing written characters by means of an erasing pen which traces same.

Referring to FIG. 11(a), there is illustrated a character "A" which is written on a sheet of recording paper with a conventional pen-recording device. The operation of writing the character "A" is conducted by operating an alphabetic key indicative of "A" on a keyboard of the device. Upon operation of the key, a control means of the device retrieves a set of character pattern data corresponding to the character from a pattern memory, and according to the retrieved set of data causes a paper feeding means to rotate a platen along a line of feed, causes a carriage carrying a writing pen and an erasing pen to move perpendicularly to the line of feed, and causes the writing pen to contact with or release from the recording paper. After one character has been written, the control means causes the carriage to bring the writing pen into position for writing the next character.

On the other hand, in order to erase the written character "A", the carriage is first located opposite to the character "A" as a result of operating a space key, a backspace key and/or the like which generate signals commanding the carriage to move. Then, an erasing key is operated so as to generate a signal commanding an erasing operation. Consequently, the control means reads the set of pattern data corresponding to the character "A" out of the pattern memory, and based on the set of data effects the same operations as performed for the above-described writing operation of the character "A", so as to cause the erasing pen to trace the character.

However, such a conventional recording device has a problem that, unless the erasing pen traces the written character "A" with high accuracy, the character is not completely erased. For example, referring to FIG. 11(b), there is illustrated the character "A" as shown in FIG. 11(a) after being so traced with the erasing pen as indicated in two-dot chain line. The character "A" traced is not completely erased, because the erasing operation was conducted with the erasing pen out of position by a small distance to the left as viewed facing the figure. This problem with the conventional type recording device results from a positioning error of the erasing pen with respect to the written character. Even if the recording device is constructed with higher accuracy, the problem will remain.

SUMMARY OF THE INVENTION

It is therefore an object of the present invention to provide a recording apparatus wherein an erasing pen finely erases a written character as a result of tracing over the character such that the area surrounding the character is traced as well as the written character itself, whereby, even if the erasing pen is located out of position for an erasing operation by some distance, it can erase the written character with certainty.

According to one aspect of the present invention, there is provided a recording apparatus capable of writing characters on a recording medium with a writing instrument, and erasing written characters with an eras- In one embodiment according to the above indicated one aspect of the present invention, the first reference line may be a Y axis parallel to the line of feed, while the second reference line may be an X axis parallel to the line of movement of the carriage.

In one form of the above embodiment of the invention, when the segment of the character is a straight segment, the second control means may judge whether the straight segment is nearer to the X axis or to the Y axis, by checking if an absolute value of a slope of the straight segment is greater than 1 or not, in a coordinate system defined by the X and Y axes.

In another form according to the same embodiment, when the segment of the character is a circular arc, the second control means may make a first judgment that the circular arc is nearer to the Y axis than to the X axis if a straight line passing a center and a midpoint of the circular arc is nearer to the X axis, and a second judgment that said circular arc is nearer to the X axis if the straight line is nearer to the Y axis.

In the preceding form of the invention, if the circular arc stretches over more than one of four divisions of an X-Y coordinate system in which an intersection of the X and Y axes is located on the center of the circular arc and which is divided into the four divisions by two straight lines represented by respective equations $Y=X$ and $Y=-X$, the second control means may make the first and second judgments for each of divided parts of the circular arc which lie in the corresponding divisions of the X-Y coordinate system.

According to another embodiment of the aspect of the invention, the second control means may modify the retrieved set of character pattern data into a first set of erasing pattern data for shifting each component of the erasing path of the erasing instrument by a predetermined distance to one side of the corresponding segment of the character, and a second set of erasing pattern data for shifting each component of the erasing path by the predetermined distance to the other side of the corresponding segment of the character, the second control means controlling the medium feeding means, the carriage driving means, and the instrument driving means, according to the first and second sets of erasing pattern data, to trace the character two times with the erasing instrument, with the predetermined distance of shifts of the erasing path to both sides of the individual segments of the character.

In accordance with still another embodiment of the invention, the second control means may modify the retrieved set of character pattern data into a first set of erasing pattern data for shifting each component of the erasing path of the erasing instrument by a predetermined distance to one side of the corresponding segment of the character, and a second set of erasing pattern data for shifting each component of the erasing path by the predetermined distance to the other side of the corresponding segment of the character, the second control means controlling the medium feeding means, the carriage driving means, and the instrument driving means, according to the retrieved set of character pattern data and according to the first and second sets of erasing pattern data, to trace the character three times with the erasing instrument.

In accordance with a further embodiment of the invention, the generator may produce a boldface signal which causes the instrument selecting means to bring the writing instrument into the operative position, the boldface signal causing the second control means to control the medium feeding means, the carriage driving means, and the instrument driving means, according to the set of erasing pattern data in place of the corresponding set of character pattern data, to write the character with a larger thickness than that of the character to be written according to the corresponding set of character pattern data under the control of the first control means.

According to a still further embodiment of the invention, the first and second control means may be constituted by a computer.

According to another aspect of the present invention, there is provided a recording apparatus capable of writing characters on a recording medium with a writing instrument, and erasing written characters with an erasing instrument, including: (A) a medium support member for supporting the recording medium; (B) a medium feeding means for feeding the recording medium in a selected one of opposite directions along a line of feed; (C) a carriage for supporting the writing and erasing instruments, the carriage being movable in a selected one of opposite directions perpendicular to the line of feed; (D) a carriage driving means for moving the carriage in said directions; (E) an instrument selecting means for selectively bringing the writing and erasing instruments into an operative position in which a writing end of the writing instrument or an erasing end of the erasing instrument is located opposite to a surface of the recording medium; (F) an instrument driving means for moving the writing and erasing instruments into the operative position, between an advanced position and a retracted position, for contact and release of the writing and erasing ends with or from the surface of the recording medium; (G) a generator for producing character signals indicative of the characters, and an erasing signal commanding an erasing operation of the erasing instrument; (H) a character pattern memory for storing sets of character pattern data representative of the characters; (I) an erasing pattern memory for storing sets of erasing pattern data corresponding to the sets of character pattern data, for erasing the characters, each of the sets of erasing pattern data permitting each of the components of an erasing path of the erasing instrument to be shifted from the character in a selected one of a first and a second direction which are normal to a first and a second reference line, respectively, the first and second reference lines intersecting with each other, the set of erasing pattern data causing the component of the erasing path to be shifted in the first direction if a segment of the character corresponding to the component is positioned nearer to the first reference line than to the second reference line, or to be shifted in the second direction if the segment is positioned nearer to the second reference line than to the first reference line; and (J) a control means, responsive to the character signal produced by the generator, for retrieving from the character pattern memory the corresponding set of character pattern data, and controlling the operations of the medium feeding means, the carriage driving means, and the instrument driving means, according to the retrieved set of character pattern data, so as to write with the writing instrument the corresponding character on the recording medium, the control means being responsive to the erasing signal produced after the character has been written, to retrieve from the erasing pattern memory the corresponding set of erasing pattern data, the control means controlling the operations of the medium feeding means, the carriage driving means, and the instrument driving means, according to the retrieved set of erasing pattern data, so as to trace the character along the erasing path with the erasing instrument.

In one embodiment of the recording apparatus according to the above aspect of the invention, the first reference line may be a Y axis parallel to the line of feed, while the second reference line may be an X axis parallel to the line of movement of the carriage.

According to still another aspect of the present invention, there is provided a method of erasing a character which has been written on a recording medium with a writing instrument of a recording apparatus according to a set of character pattern data which is stored in a pattern memory and is representative of the character, the method including the steps of: (1) modifying the set of character pattern data into a corresponding set of erasing pattern data which permits each of the components of an erasing path of an erasing instrument to be shifted from the written character in a selected one of a first and a second direction which are normal to a first and a second reference line, respectively, the first and second reference lines intersecting with each other, the set of erasing pattern data causing the component of the erasing path to be shifted in the first direction if a segment of the written character corresponding to the component is positioned nearer to the first reference line than to the second reference line, or to be shifted in said second direction if the segment is positioned nearer to the second reference line than to the first reference line; and (2) controlling movements of the erasing instrument and the recording medium according to the corresponding set of erasing pattern data, to trace the written character along the erasing path.

BRIEF DESCRIPTION OF THE DRAWINGS

The aforementioned and other objects of the present invention will be readily appreciated as the same becomes better understood by reference to the following detailed description when considered in connection with the accompanying drawings, in which:

FIG. 4 is a block diagram of a control system for the recording apparatus of FIG. 1;

FIG. 5(a) is an X-Y orthogonal coordinate system which is divided into two regions, "region A" and "region B", by a pair of straight lines represented by respective equations, $Y=X$ and $Y=-X$;

FIGS. 5(b)-(f) illustrate a tracing for erasing a segment which constitutes a written character;

DETAILED DESCRIPTION OF THE PREFERRED EMBODIMENTS

Referring to the accompanying drawings, preferred embodiments of the invention will be described in detail.

Figure 1:
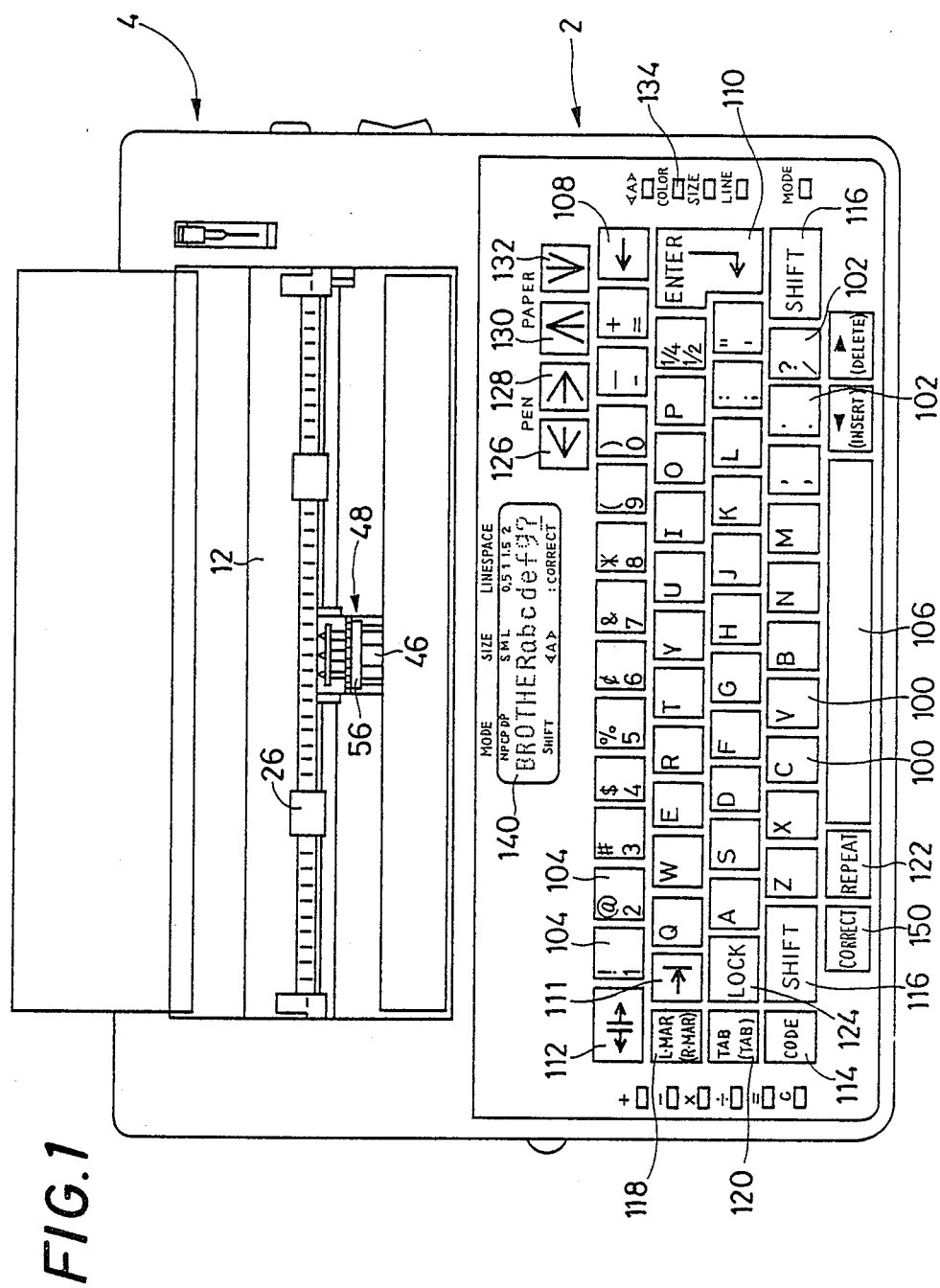
FIG. 1 is a plan view of one embodiment of a recording apparatus according to one aspect of the invention, having a keyboard and using ball-point pens as writing and erasing instruments.

In a plan view of FIG. 1, there is shown one embodiment of a recording apparatus according to one aspect of the present invention. The recording apparatus has a keyboard 2 at its front half, and a recording section 4 at its rear half.

Figure 2:
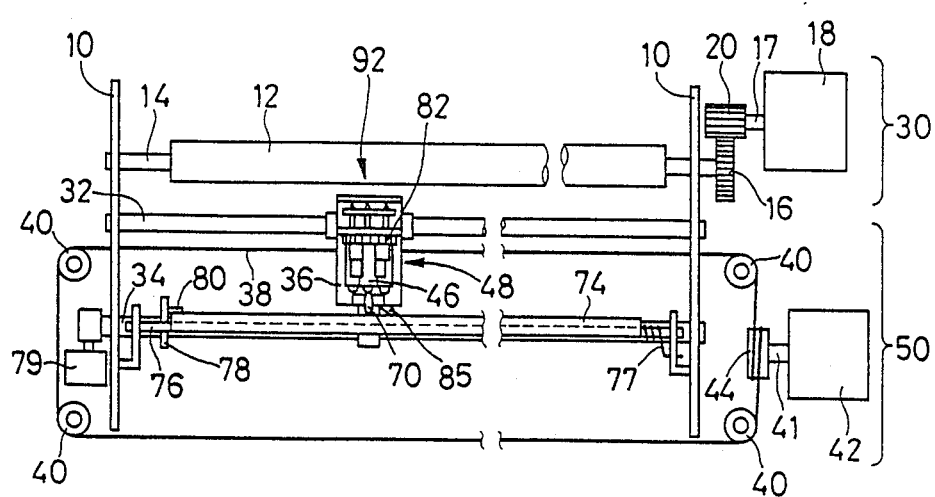
FIG. 2 is a schematic plan view of a recording mechanism of the recording apparatus of FIG. 1.
Figure 3:
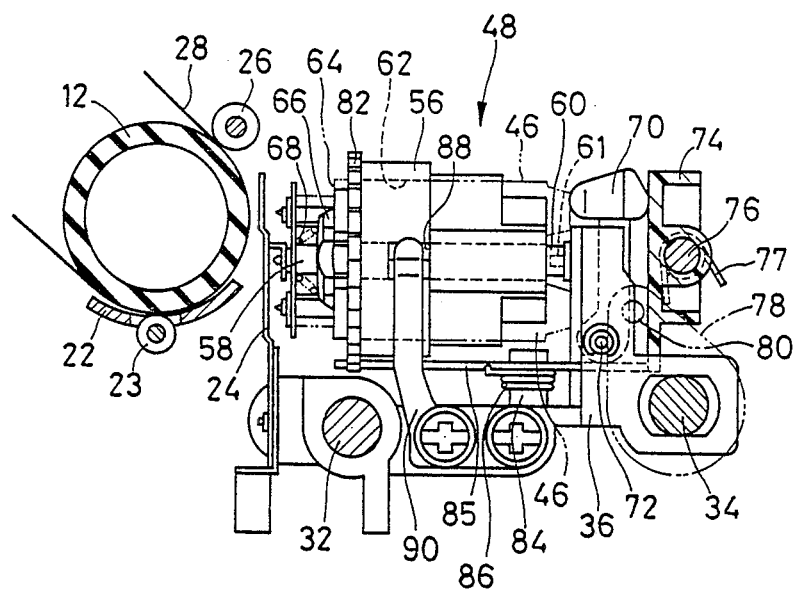
FIG. 3 is an enlarged elevational side view partly in cross section of a pen-holding head and its vicinity of the recording apparatus of FIG. 1.

A recording mechanism of the section 4 is schematically illustrated in FIG. 2, wherein reference numerals 10 designate a pair of opposed side frames of a main frame structure of the apparatus. These side frames 10 rotatably support a shaft 14 of an elongate cylindrical platen 12 which serves as a paper support member. The shaft 14 has a gear 16 fixed to one end thereof. The gear 16 meshes with a pinion 20 which is fixed to an output shaft 17 of a platen drive motor 18. The platen 12 is rotated by an angular amount as needed, by the motor 18, in a selected one of opposite directions, i.e., either a forward or a reverse direction. As shown in FIG. 3, the platen 12 cooperates with a paper pan 22, presser rollers 23, paper guide 24, paper bail rollers 26, and other parts, to constitute a paper supporting device for guiding and supporting a sheet of recording paper 28 along the circumferential surface of the platen 12. On the other hand, the gear 16, platen drive motor 18, and pinion 20 constitute a major part of a paper feeding device 30 for feeding the sheet of paper 28 in the Y-axis direction perpendicular to an axis of rotation of the platen 12.

Two mutually parallel guide rods 32, 34 extend parallel to the platen 12 between the opposed side frames 10. These two guide rods 32, 34 slidably support a carriage 36 along the length of the rods 32, 34. A carriage drive wire 38, which is fixed at its opposite ends to the carriage 36, is guided in a loop by four idler guide rollers 40. The drive wire 38 is wound on a drive pulley 44 fixed to an output shaft 41 of a carriage drive motor 42. With bidirectional rotary movements of the drive motor 42, the loop of the drive wire 38 is rotated in the corresponding directions along the axis of the platen 12, i.e., in the X-axis direction perpendicular to the Y-axis along which the sheet of paper 28 is fed by the paper feeding divice 30. The carriage 36 carries a multi-station indexable pen-holding head 48 which supports plural ball-point pens 46 including a writing pen, erasing pen, rewriting pen and the like. In this arrangement, the ball-point pens 46 are moved in the X-axis direction when the carriage 36 is reciprocated. The drive wire 38, guide rollers 40, carriage drive motor 42, and pulley 44 constitute a major part of a carriage driving device 50 for moving the carriage 36 in the X-axis direction.

With the X-axis movements of the carriage 36 by the carriage driving device 50, in combination with the Y-axis movements of the sheet of paper 28 by the paper feeding device 30, the pens 46 are movable in any direction relative to the sheet of paper 28, whereby desired characters such as letters and symbols may be recorded or written on the sheet of paper 28.

The multi-station indexable pen-holding head 48 is constructed as shown in FIG. 3. The pen-holding head 48 includes a holder body 56 which is supported on the carriage 36 rotatably or indexably about its axis substantially perpendicular to the axis of the platen 12. Stated more particularly, the pen holder body 56 has a short shaft 58 extending from its one end on the side of the platen 12, and a boss 60 formed at its other end. The short shaft 58 is rotatably supported by the paper guide 24, and a projection 61 extending from the carriage 36 is fitted in a boss 60 of the holder body 56. Thus, the holder body 56 is rotatably supported on the carriage 36. The holder body 56 has four pen holes 62 which are formed in evenly spaced-apart relation with each other circumferentially of the holder body 56. In other words, the pen holes 62 are equiangularly spaced from each other along a circle whose center is aligned with the axis of rotation of the holder body 56. Each of the four pen holes 62 can accommodate a ball-point pen 46 selected from a group of a writing pen, erasing pen, rewriting pen, and the like. The ball-point pens 46 are axially slidable in the holes 62. Thus, the holder body 56 carries the four ball-point pens 46. The end portion of each pen 46 on the side of its writing tip is smaller in diameter than the remaining portion, and terminates at a shoulder 64 on which a biasing force of a spring 68 is exerted via a commonly used return plate 66.

On the other hand, a hammer 70 is disposed behind the holder body 56, and supported on the carriage 36 pivotably about a pin 72. Behind the hammer 70 is disposed a hammer drive plate 74 which is pivotable about a shaft 76 and which is biased clockwise as viewed facing FIG. 3 by means of a spring 77. The biasing force of spring 77 is limited with a pin 80 (below described). The guide rod 34 has a lever 78 fixed thereto. When the guide rod 34 is rotated upon activation of a solenoid 79 (see FIG. 2), the hammer drive plate 74 is pivoted counterclockwise (as viewed in FIG. 3) with the pin 80 fixed to the lever 78 while overcoming the above-indicated biasing force of spring 77. Thus, the hammer 70 is pivoted in the same direction, which drives the currently selected ball-point pen 46 against the biasing force of the return spring 68 until the writing tip of the pen 46 contacts the surface of the sheet of paper 28. At this time, the return plate 66 is inclined by a suitable angle to permit the ball-point pen 46 to be advanced. The hammer 70, drive plate 74, shaft 76, lever 78, and solenoid 79 cooperate with the return plate 66 and spring 68 to constitute a major part of a pen driving device for advancing and retracting the currently selected ball-point pen 46 toward and away from the surface of the sheet 28 retained on the platen 12, respectively.

Each of the four ball-point pens 46 mounted on the holder body 56 is brought into a printing position when placed at the top of the circle along which the holder body 56 is rotated. In the printing position, the ball-point pen 46 is opposite, substantially perpendicularly, to the circumferential surface of the platen 12, and can advance toward the platen 12 with the hammer 70. Out of the four ball-point pens 46, a desired pen 46 may be located in the printing position as a result of rotation of the holding body 56 by a suitable angle along the above-identified circle.

Furthermore, a feeding arm 85 of more or less V-shaped configuration is secured at its bent portion to a shaft 84 fixed to the carriage 36 such that the arm 85 is rotatable about the shaft 84. One of the end portions of the feeding arm 85 is in abutment on a lower-end portion of the hammer drive plate 74 as shown in FIG. 3. On the other hand, the other end portion of the arm 85 may be brought into engagement with a ratchet wheel 82 disposed around the end portion of the holder body 56 on the side of the platen 12. In the situation illustrated in FIG. 3, the feeding arm 85 is biased by a coil spring 86 wound around the shaft 84 in such a direction as to permit no feeding of the ratchet wheel 82. That is, the biasing force of the coil spring 86 is limited or stopped with the lower-end portion of the hammer drive plate 74.

In the case where the guide rod 34 is rotated counterclockwise (as seen facing FIG. 3) upon deactivation of the solenoid 79, and consequently the lever 78 is moved in the same direction, the hammer drive plate 74 is released from limitation by the pin 80 and is rotated clockwise about the shaft 76 with the help of the above-indicated biasing force of spring 77. As a result, based on the rotary movement of the lower-end portion of the hammer drive plate 74, the feeding arm 85 is rotated about the shaft 84 against the biasing force of the coil spring 86 so as to feed the ratchet wheel 82 and rotate the holder body 56. With repetition of the same operations, the pen holder body 56 is successively rotated so as to index a desired ball-point pen out of the four pens 46 into the printing position.

On the outer circumferential surface of the holder body 56, four lines of V-shaped grooves 88 are formed equiangularly spaced from each other and in parallel with the longitudinal axis of the holder body 56. In the case where any one of the grooves 88 is engaged with an end portion of a sheet spring 90 fixed to the carriage 36, the rotation of the holder body 56 is stopped and the holder body 56 is fixed in position. The holder body 56, ratchet wheel 82, feeding arm 85, biased hammer drive plate 74, spring 77, lever 78, solenoid 79 and sheet spring 90 cooperate with each other to constitute a major part of a pen selecting device 92 for indexing a desired ball-point pen out of the four pens 46 into the printing position.

In this connection, since the hammer drive plate 74 extends in the X-axis direction over the same length as the longitudinal axis of the platen 12, the pen selecting operation as described above is accomplished irrespective of the location of the carriage 36 on its line of movement.

As is apparent from the foregoing description, the solenoid 79 used in this embodiment serves as a drive source not only for the pen driving device but also for the pen selecting device 92. That is to say, in the case where the lever 78 is rotated clockwise (as seen in FIG. 3), the ball-point pen in the printing position is brought into contact with the recording paper 28, while, in the case where the lever 78 is rotated counterclockwise, a desired ball-point pen 46 is indexed into the printing position.

Referring back to FIG. 1, the keyboard 2 will be described. The keyboard 2 has character keys which include a multiplicity of alphabetic keys 100, symbol keys 102 and numeric keys 104, and further has a multiplicity of function keys which include: a space key (space bar) 106; a backspace key 108; a return key 110; a tab key 111; a margin release key 112; a CODE key 114; SHIFT keys 116; a margin set key 118; a tab set key 120; a REPEAT key 122; and a LOCK key 124. The keyboard 2 also has pen position keys 126, 128 for moving the carriage 36 bidirectionally along the X-axis, and paper feed keys 130, 132 for rotating the platen 12 bidirectionally along the Y-axis, together with a pen index key 134 for indexing a desired ball-point pen out of the four pens 46.

In an upper central part of the keyboard 2, there is provided a liquid crystal display 140 which displays keyed-in characters in such a manner that the already displayed characters are shifted one position to the left each time a new character is keyed in through the character keys 100.

The keyboard 2 also has a CORRECT key 150 next to the REPEAT key 122. The CORRECT key 150 is operated for two kinds of erasing operations in which written characters are erased. The two kinds are a manual erasing operation and an automatic one.

At the beginning of the manual erasing operation, the writing ball-point pen 46 in the printing position is brought into face-to-face relation with a character to be erased, by means of operating the pen position keys 126, 128 and the paper feed keys 130, 132. With the CORRECT key 150 then operated, an ERASING mode is established, which automatically causes the ball-point pen holder body 56 to be rotated so as to bring the erasing ball-point pen 46 into the printing position. In the case where the character to be erased is a capital "A" for example, the character key 100 indicative of "A" is subsequently worked. As a result, the erasing pen 46 traces the character "A" which has been written on the sheet 28. During this erasing operation, the liquid crystal display 140 indicates that the apparatus is now in the ERASING mode. And with the CORRECT key operated for the second time, the indication on the display 140 is extinguished, and the ERASING mode is cancelled to establish a WRITING mode.

There will be described, on the other hand, the automatic erasing operation of the instant embodiment that is adapted to store information about characters written on a line along which the writing ball-point pen 46 (carriage 36) is currently advancing. In the beginning, the writing pen 46 is placed in face-to-face relation with the character to be erased, for example a capital "R", on the line by means of operating the pen position keys 126, 128. Then, the CORRECT key 150 is operated while the CODE key 114 is also operated. Upon operation of these keys 114 and 150, the erasing ball-point pen 46 is automatically placed in the printing position in place of the wriring pen 46. At the same time, a CPU 160 (below described) judges, from the above-indicated information about the written characters that is stored in a character data memory 180 (below described), that the character to be erased is a capital "R". Thus, the character "R" is erased with the erasing pen 46.

Referring next to FIG. 4, there is illustrated a control system for controlling the recording section 4 according to input data which are keyed in through the keyboard 2 described above in detail. In FIG. 4, the CPU (central processing unit) 160 is connected to the keyboard 2 serving as an input device. The CPU 160 is also connected to a ROM (read only memory) 162 and a RAM (random access memory) 164. The ROM 162 serves as a program memory 166 which stores programs for executing operations indicated with the flow charts of FIGS. 6-8 together with other programs for controlling operations of the recording apparatus as a whole. The ROM 162 also serves as a pattern memory 168 which stores sets of character pattern data corresponding to the characters (alphabetics, numerics, and symbols) that can be keyed in via the keyboard 2. The set of character pattern data corresponding to one character includes data about the positions of end points of each segment partially constituting the character, data about whether the ball-point pen 46 contacts or releases with or from the sheet 28, and data about whether the segment is a straight segment or a circular arc.

The RAM 164 serves as the character data memory 180 for temporalily storing code data that has been keyed in through the keyboard 2, and also serves as memories, counters and registers which help the CPU 160 to execute a variety of programs. The RAM 164 further serves as a pen counter 182 for storing information about which ball-point pen 46 of the four pens 46 is now in the printing position.

The CPU 160 is also connected to a platen drive circuit 200, a carriage drive circuit 202, a solenoid drive circuit 204 and a display drive circuit 206 which are in turn connected to the platen drive motor 18, the carriage drive motor 42, the solenoid 79 and the liquid crystal display 140, respectively.

Before entering into a discussion about the flow charts shown in FIGS. 6-8, a fundamental concept upon which the present invention is based will be described below referring to the six illustrations in FIGS. 5 (a) through (f).

In FIG. 5(a), there is illustrated an X-Y orthogonal coordinate system which is divided into four divisions by a pair of straight lines represented by respective equations, $Y=X$ and $Y=-X$. Out of the four divisions, a pair of opposite divisions containing the X-axis is indicated as "region A", and the remaining opposite divisions containing the Y-axis as "region B". Hereinafter, it is supposed that this coordinate system is located on the sheet 28 supported by the platen 12 and may be translated with respect to the X- and Y-axes of the apparatus, i.e., the line of movement of the carriage 36 and the line of feed of the sheet 28.

In FIGS. 5 (b) and 5(c), there is illustrated in full line a straight segment which constitutes part of a character written on the sheet 28. This segment has an angle of 60° with respect to the X-axis of the apparatus, i.e., the X-axis of the coordinate system of FIG. 5(a), and lies in the region B if the coordinate system is translated such that the origin of the system rests on any point of the segment. Therefore, the segment is regarded as representative of a straight segment that lies in the region B of the system. The segment will be traced with the erasing pen 46.

In FIG. 5(b), there are further illustrated in one-dot chain line and in two-dot chain line a pair of straight segments of exactly the same shape as the one shown in full line. The pair of chain line segments represent respective tracings which have been made by the erasing pen 46. These tracings are obtained by translating the written segment in both the positive and negative directions of the X-axis by a predetermined distance or unit distance. The area surrounded with the one-dot and two-dot chain lines, i.e., the area that has been traced by two-time tracings using the erasing pen 46, covers the written segment so as to allow a margin to be provided around the actually written segment, i.e., covers not only the segment but also an area surrounding that segment.

Similarly, in FIG. 5(c), there are further illustrated in one-dot chain line and in two-dot chain line a pair of straight segments of the same shape as the one shown in full line. The pair of chain line segments also represent respective tracings conducted by the erasing pen 46. These tracings are obtained by translating the written segment in both the positive and negative directions of the Y-axis, rather than the X-axis, by the unit distance. The width of the area surrounded with the one-dot and two-dot chain lines is smaller than that of the area surrounded with the same lines shown in FIG. 5(b).

Therefore, it is concluded that the straight segment lying the in the region B is preferably erased by a pair of tracings with the erasing pen 46 along erasing paths of the pen 46 that have respectively been shifted in the positive and negative directions of the X-axis by the unit distance. In other words, in the case that the straight segment to be erased lies in the region B, the width of the area that is traced by the erasing pen 46, whose erasing path is shifted by the unit distance both in one of opposite directions and in the other direction, becomes larger when the erasing path is shifted bidirectionally along the X-axis than when it is shifted along the Y-axis.

On the other hand, in FIG. 5(d) there is also shown in full line a straight segment. This segment has an angle of 30° with respect to the X-axis of the coordinate system of FIG. 5(a), and lies in the region A if the origin of the system is located on any point of the segment. Hence, the segment is regarded as representative of a straight segment that lies in the region A. As can be understood from the figure, the area that is traced with the erasing pen 46 extends more widely over the written segment when the erasing path of the pen 46 is shifted from the segment by the unit distance in both the positive and negative directions of the Y-axis than when it is shifted in both the positive and negative directions of the X-axis.

Therefore, the straight segment lying in the region A is preferably erased with the erasing pen 46 by shifting the erasing path of the pen 46 bidirectionally along the Y-axis by the unit distance, rather than along the X-axis.

In this connection, a straight segment which lies just on the borderlines, Y=X and Y=-X, when the origin of the coordinate system of FIG. 5(a) is placed anywhere on the segment, may be assumed to belong either to the region A or the region B. Namely the area traced with the erasing pen 46, where the erasing path of the pen 46 is shifted bidirectionally along the X-axis is equal to that where the erasing path is shifted along the Y-axis.

The judgment whether the erasing path of the erasing pen 46 should be shifted along the X-axis or Y-axis for erasing a straight segment, may be otherwise conducted.

As an example, there is a method for conducting above judgement, wherein it is checked whether or not an absolute value of a slope of a straight segment in the X-Y orthogonal coordinate system is greater than 1. Described in detail, in the case where the value is greater than 1, the segment is preferably traced by shifting the erasing path of the erasing pen 46 along the X-axis, while, in the case where the value is smaller than 1, the segment is preferably traced by shifting the erasing path of the erasing pen 46 along the Y-axis.

While there has been described the tracing operation for erasing a straight segment, there will be discussed a tracing operation for erasing a circular arc segment which partially constitutes a written character.

On the sheet 28 on which a circular arc to be erased is written, the coordinate system of FIG. 5(a) is located such that the origin of the system is positioned on the center of the arc, and it is checked if the arc exists within the region A or the region B. If the circular arc is completely contained in the region A, the arc is judged to be in the region A, while if the arc is completely contained in the region B, the arc is judged to be in the region B. In this connection, if the arc bridges between the region A and the region B, the arc is divided by the borderlines, Y=X and Y=-X, into plural parts, each of which is in turn judged as to whether the part is in the region A or in the region B.

In FIG. 5(e), there is illustrated in full line an arc as representative of a circular arc segment lying in the region B. As is apparant from the figure, the area that is traced by the erasing pen 46 is more effectively broadened in a direction toward the center of the arc, when the erasing path of the pen 46 is shifted by the unit distance from the arc in both the positive and negative directions along the Y-axis, than when the path is shifted along the X-axis. Therefore, in the case where the arc to be erased exists in the region B, it is more advantageous to shift the erasing path of the erasing pen 46 by the unit distance in the positive and negative directions of the Y-axis so as to increase the area traced with the pen 46.

In FIG. 5(f), there is also shown in full line an arc as an example of a circular arc segment lying in the region A. As is apparent from the figure, the area traced with the erasing pen 46 is more effectively broadened when the erasing path of the pen 46 is shifted by the unit distance in the positive and negative directions of the X-axis rather than the Y-axis. Therefore, in the case where the arc to be erased is contained in the region A, the area traced with the erasing pen 46, as a result of two-time tracing operations at respective positions spaced apart by the unit distance from the written arc in opposite directions, becomes larger when the erasing path of the pen 46 is shifted along the X-axis than along the Y-axis.

Attention should be given to the fact that a straight segment in the region A (region B) is preferably traced by means of shifting an erasing path of the erasing pen 46 along the Y-axis (X-axis) while a circular arc in the region A (region B) is preferably traced by means of shifting the erasing path along the X-axis (Y-axis).

The above-described method is not the only method for judging whether the erasing path of the erasing pen 46 should be shifted from the arc by the unit distance along the X-axis or the Y-axis. For example, there is a method for the judgement, wherein there is introduced a straight line (hereinafter, referred to as "central line") which connects the middle point of both end points of an arc and the center of the same on the coordinate system of FIG. 5(a), and it is checked whether the central line lies in the region A or the region B when the origin of the system rests on the center of the arc.

The judgment may be conducted by checking if an absolute value of a slope of the central line with respect to the X-axis exceeds 1 or not. Described in detail, in the case where the value exceeds 1, the segment is preferably traced with erasing pen 46 by shifting the erasing path along the Y-axis, while in the case where the value is smaller than 1, the segment is preferably traced with the erasing pen 46 by shifting the erasing path along the X-axis.

Operations of the instant embodiment will be described, referring to the flow charts shown in FIGS. 6-8.

Figure 6:
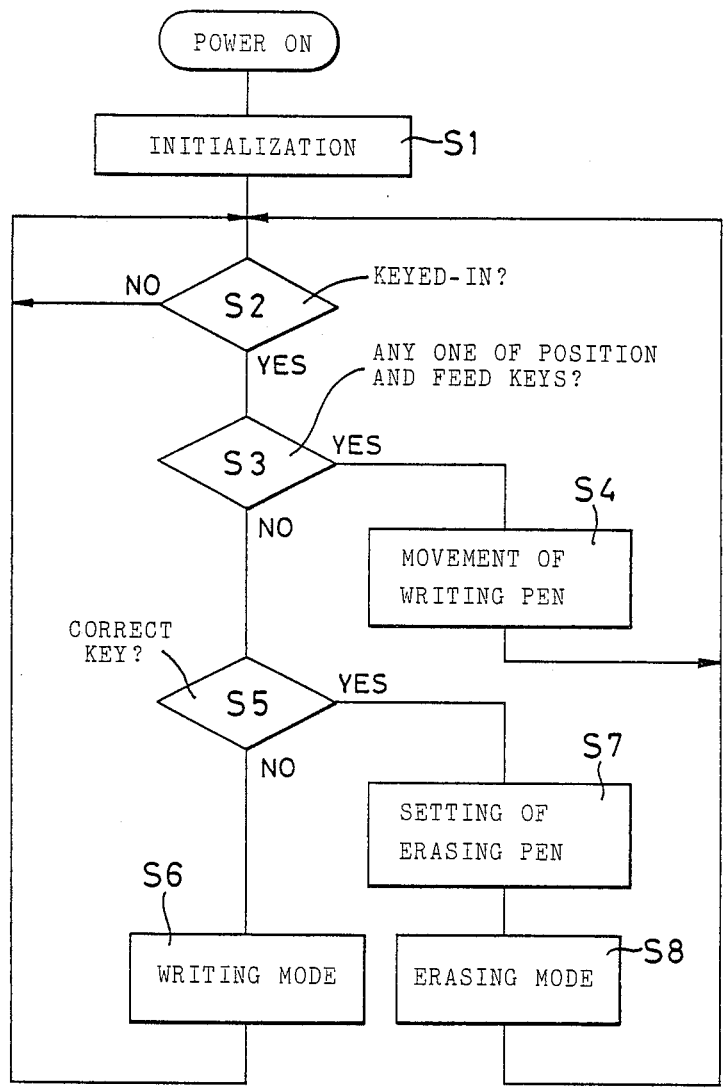
FIG. 6 is a flow chart for executing a main routine in the recording apparatus of FIG. 1.

In the main routine flow chart of FIG. 6, upon application of power to the instant recording apparatus, the CPU 160 goes to step S1 in which the CPU 160 executes the same initializing operations as conventional devices do, such as resetting of the memories and counters such as those indicated at 166, 168, 180 and 182 (FIG. 4), returning of the carriage 36 to its initial position, and subsequent moving of the carriage 36 to the left margin position. In this step S1, the writing ball-point pen 46 is also located in the printing position. Step S1 is followed by step S2 which is repeatedly executed to check if any key on the keyboard 2 has been operated. When any key has been operated, the CPU 160 goes to step S3 wherein the CPU 160 checks if the code data keyed in upon operation of the keyboard 2 corresponds to any one of the pen position keys 126, 128 and paper feed keys 130, 132. If the checking in step S3 indicates that one of those keys 126, 128, 130, 132 has been operated, the CPU 160 goes to step S4 to cause the ball-point pens 46 to move relative to the sheet 28, and then the CPU 160 returns to step S2.

In the event that the checking in step S3 indicates that none of the keys 126, 128, 130, 132 have been operated, the CPU 160 goes to step S5 to check if the keyed-in code data corresponds to the CORRECT key 150. If the checking in this step S5 is negative (NO), the CPU 160 goes to step S6. In this step S6, the CPU 160 executes operations for writing a character in the WRITING mode in compliance with the flow chart shown in FIG. 7, and after completion of the operations the CPU 160 goes back to step S2. If the checking in step S5 is affirmative (YES), i.e., if the CORRECT key 150 has been operated, the CPU 160 goes to step S7 to locate the erasing ball-point pen 46 in the printing position, and then goes to step S8. In this step S8, the CPU 160 executes operations for erasing a character in the ERASING mode in accordance with the flow chart of FIG. 8. After execution of step S8, the CPU 160 goes back to step S2 which is repeatedly executed to check if any key on the keyboard 2 has been operated.

Figure 7:
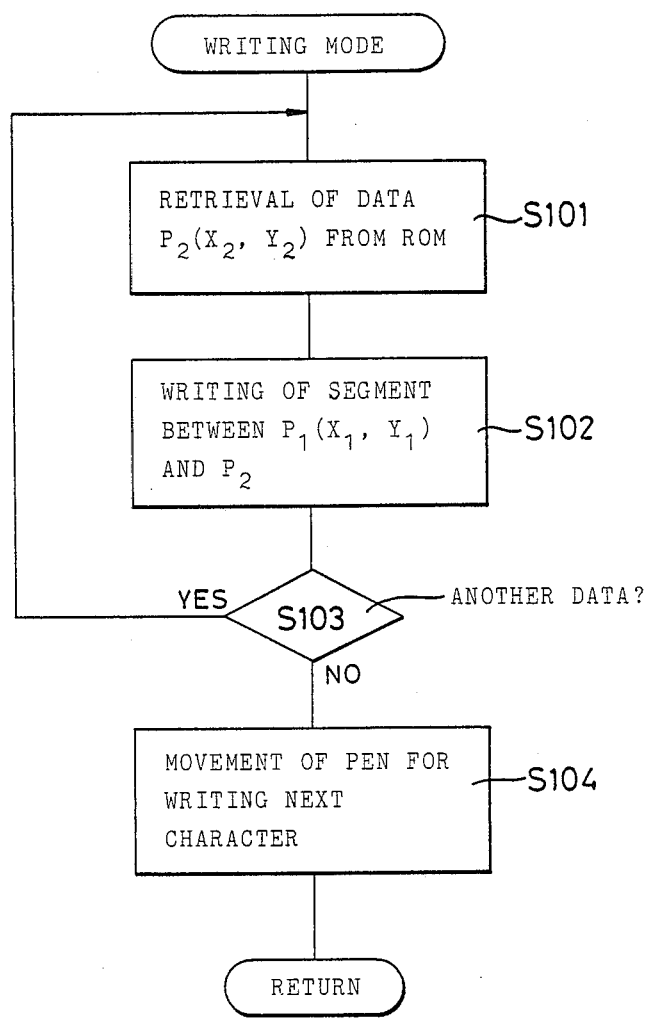
FIG. 7 is a flow chart for executing a writing operation of step S6 in the flow chart of FIG. 6.
Figure 8:
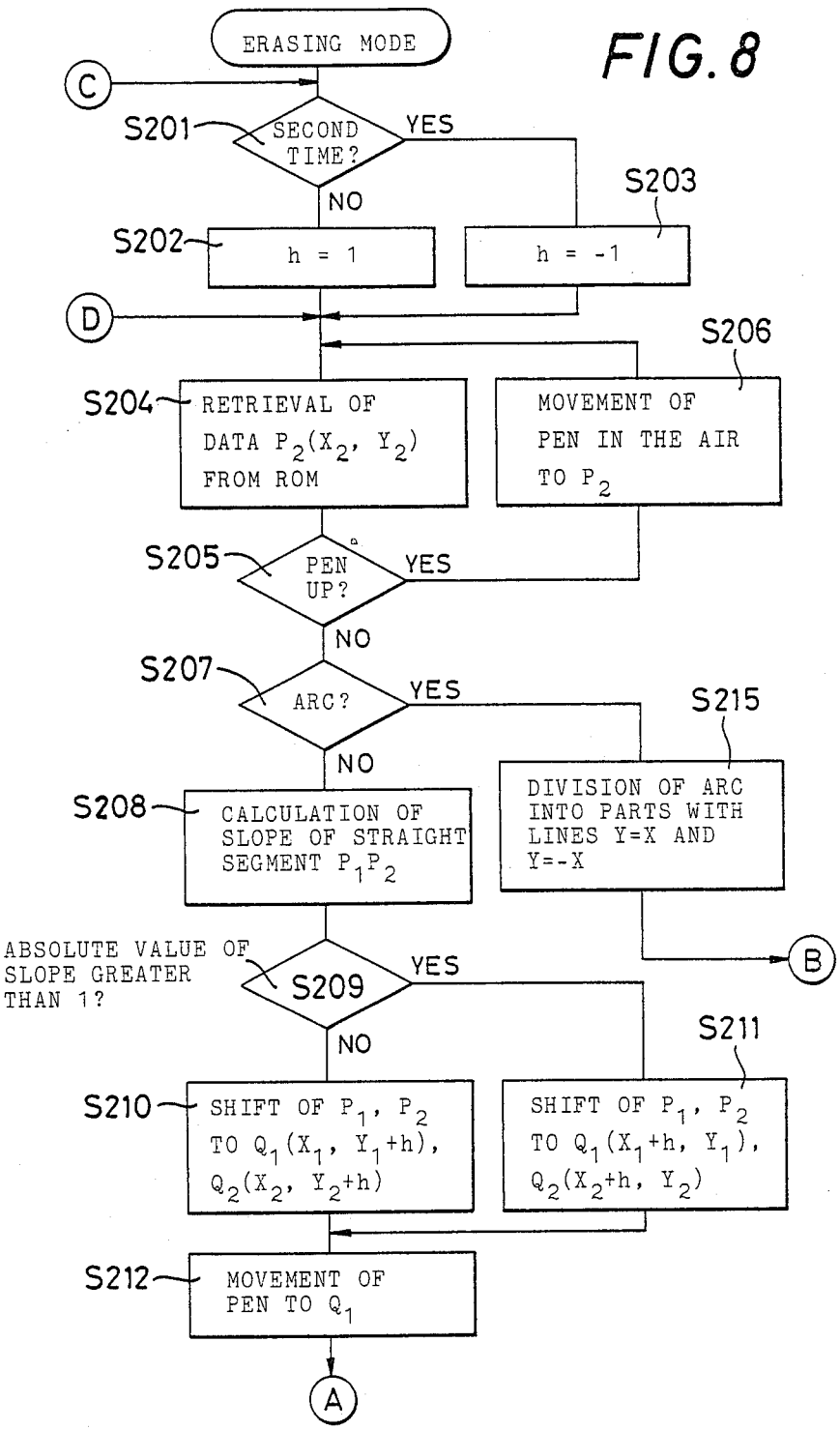
FIG. 8 and FIG. 8A are a flow chart for executing an erasing operation of step S8 in the flow chart of FIG. 6.
Figure 8A:
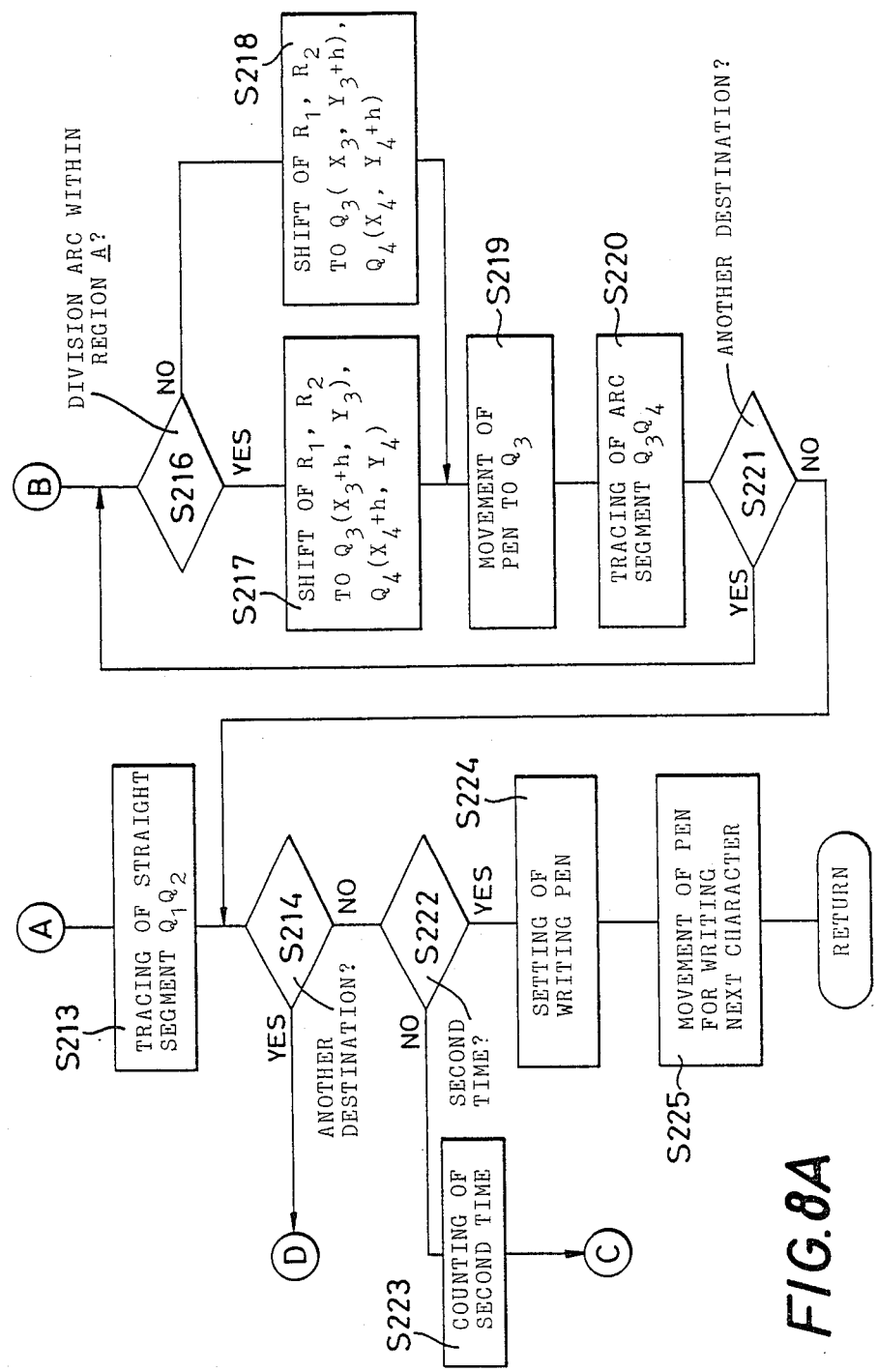
Figure 9A:
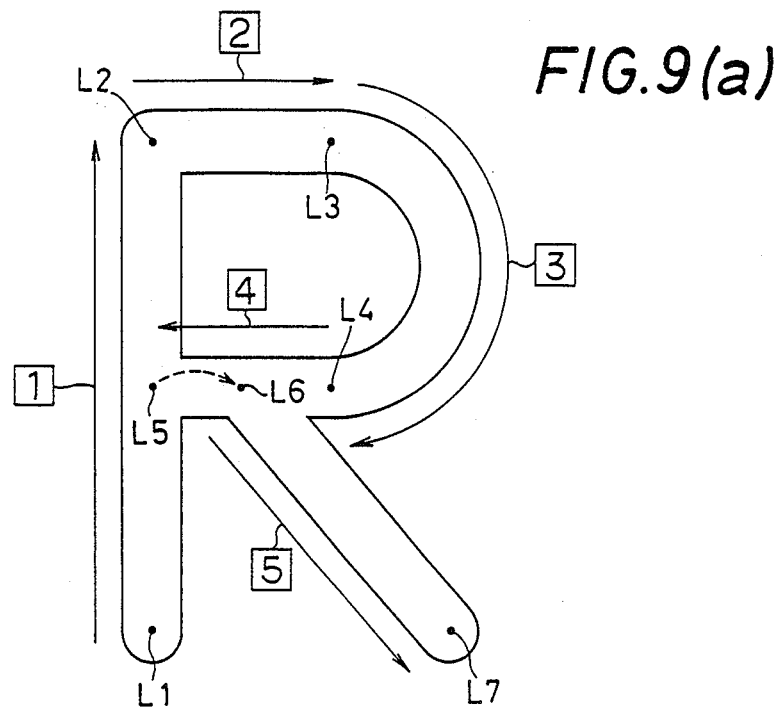
FIGS. 9(a)-(d) are illustrations for explaining a fundamental concept of the invention, showing an erasing operation in which a capital "R" is traced.

Referring next to FIGS. 7, and 9(a), there will be discussed an execution of writing a character, for example, a capital "R" in the WRITING mode, i.e., in step S6 in the flow chart of FIG. 6.

In FIG. 9(a), there is illustrated the capital "R" which is written on the sheet 28 in accordance with numbered arrows in order. Points L1 through L7 in the figure represent end points of all segments that constitute the character "R". At the beginning of a writing operation, the writing pen 46 is placed at an initial point (present point) $P_1$ (point L1 for the character "R").

In step S101 of the flow chart shown in FIG. 7, the CPU 160 retrieves pattern data about the next point (destination point) $P_2$ (point L2 for "R") from the pattern memory 168. The pattern data retreived includes (1) data about the position of destination point $P_2$, (2) data about whether or not the writing pen 46 goes in the air between present point $P_1$ and destination point $P_2$ and (3) data about whether the segment to be written is a straight segment or a circular arc. Step S101 is followed by step S102 wherein the writing pen 46 moves from point $P_1$ to point $P_2$. If the pattern data commands the pen 46 to release from the sheet 28 at present point $P_1$, the pen 46 cannot write anything between points $P_1$ and $P_2$. If the pattern data commands the pen 46 to contact with the sheet 28, the pen 46 writes a straight segment. If the data commands the pen 46 to write a circular arc, the pen writes it. In the case of the capital "R", the pen 46 writes the straight segment L1L2 to connect two points $P_1$ and $P_2$ by means of making use of a relative, contact movement between the pen 46 itself and the sheet 28. Following step S102, the CPU 160 goes to step S103 to check if there is another pattern data to be executed. Since the pattern data about point L3 is given for the letter "R", the judgement in step S103 is affirmative (YES). Then, the CPU 160 returns to step S101. The routine from step S101 to S103 as described above will be repeated to write the character "R". In this connection, between points L3 and L4 of the letter "R" the pen 46 writes an arc, and between points L5 and L6 the pen 46 writes nothing, i.e., moves from point L5 to point L6 in the air. After the character "R" is written to the last point L7, the CPU 160 judges in S103 that all sets of pattern data of the character R have been executed. As a result, the CPU 160 goes to step S104 wherein the CPU 160 causes the writing pen 46 to move to the next position on the sheet 28, and the CPU 160 goes back to step S2 of the flow chart shown in FIG. 6.

The above-identified character pattern data, which commands the writing pen 46 to write a circular arc, includes (1) data about the position of the center of the arc to be written, (2) data about the direction (clockwise or couterclockwise) in which the pen 46 moves about the center, and (3) data about the central angle of the sector which is formed around the center by the arc. Based on the pattern data, a circular arc is written to connect two points, i.e., present point $P_1$ and destination point $P_2$.

Referring next to FIGS. 5(a), 8, 8A, 9(b) and 9(c), there will be described operations for erasing a character in the ERASING mode, i.e., in step 8 of the main routine in FIG. 6, wherein the capital "R" is erased. In the flow chart of FIG. 8, the CPU 160 knows which character is to be erased, judging from the position of the ball-point pen 46 (carriage 36), because the character data memory 180 stores information about the character to which the carriage 36 is now opposite. That is, the CPU 160 is placed in the automatic ERASING mode previously described.

In the beginning, in step S201, the CPU 160 checks if it is for the second time that the CPU 160 itself enters this step. Since the CPU 160 enters the step S201 for the first time, the checking in this step is negative (NO), and the CPU 160 goes to step S202. In step S202, the CPU 160 selects 1 as the value of "h". The symbol h denotes a unit distance by which each component of an erasing path of the erasing pen 46 is shifted from the written character in the positive direction of the X-axis or Y-axis when the erasing pen 46 traces the character. Step S202 is followed by step S204 wherein the CPU 160 reads the pattern data about the next point (destination point) $P_2(X_2, X_2)$ (for the character "R", point L2) out of the pattern memory 168, and the CPU 160 goes to step S205. In step S205, the CPU 160 checks if the pattern data includes data to command the erasing pen 46 to move up in the air from an initial point (present point) $P_1$ to the next point (destination point) $P_2$. If the checking in step S205 in affirmative (YES), the CPU 160 goes to step S206 to move the erasing pen 46 up in the air throughout to point $P_2$, and returns to step S204. Since, in the case of the character "R", points $L_1$ and $L_2$ are connected to each other with a segment, the judgement in step S205 is negative (NO). Consequently, in step S207, the CPU 160 checks whether the segment between points $P_1$ and $P_2$ to be traced is a straight segment or a circular arc segment. For "R", the segment is a straight one, and the checking in step S207 is negative (NO). Then, the CPU 160 goes to step S208. In step S208, the CPU 160 works out an absolute value of a slope $\theta_1$ of the segment $P_1P_2$ in the X-Y coordinate system of FIG. 5(a). And in step S209, the CPU 160 checks if $\theta_1$ is greater than 1 or not. In this connection, the checks in S208 and S209 may be otherwise conducted. As an example, there is a method wherein the coordinate system of FIG. 5(a) is located such that the origin of the system is positioned on any point of the segment $P_1P_2$, and it is checked if the segment $P_1P_2$ lies in the region A or region B. The slope $\theta_1$ of the segment L1L2 of the character "R" is greater than 1, and the check in step S209 is affirmative (YES). Hence, the CPU 160 goes next to step S211 wherein the CPU 160 modifies the data $P_1(X_1, Y_1)$ and $P_2(X_2, Y_2)$ (for "R", points L1 and L2) into data $Q_1(X_1+h, Y_1)$ and $Q_2(X_2+h, Y_2)$ (for "R", points M1 and M2). In other words, points M1 and M2 are obtained by shifting points L1 and L2 by the unit distance (the value h) in the positive direction of the X-axis. Then, the CPU 160 enters step S212 wherein the CPU 160 causes the erasing pen 46 to move in the air to point $Q_1$ (point M1), and further in step S213 (FIG. 8A), causes the erasing pen 46 to write a straight segment to connect between two points $Q_1$ and $Q_2$, i.e., M1 and M2 for the character "R". In the following step S214, the CPU 160 checks if there is another pattern data about the next point (destination point $P_2$). In this case, point L3 exists, and the checking in step S214 is affirmative (YES). Then, CPU 160 goes back to step S204.

For erasing the character "R", the segment between points L2 and L3 is subsequently traced by the erasing pen 46, in the same manner as in the case of the segment L1L2 except step S209 wherein the checking of the CPU 160 is negative (NO). Because an absolute value of a slope of the segment L2L3 is smaller than 1, the CPU 160 goes to step 210 wherein the CPU 160 adds the value h to the Y coordinate of each of present point $P_1(X_1, Y_1)$ (point L1, for "R") and destination point $P_2(X_2, Y_2)$ (point L2) so as to obtain points $Q1(X_1, Y_1+h)$ and $Q_2(X_2, Y_2+h)$. The thus obtained points $Q_1$ and $Q_2$ correspond to points M3 and M4 of the character "R", respectively. In other words, points $M_3$ and $M_4$ are shifted from the position of points L2 and L3 by the value "h" in the positive direction of the Y axis, i.e., the line of feed of the sheet 28.

Figure 9B:
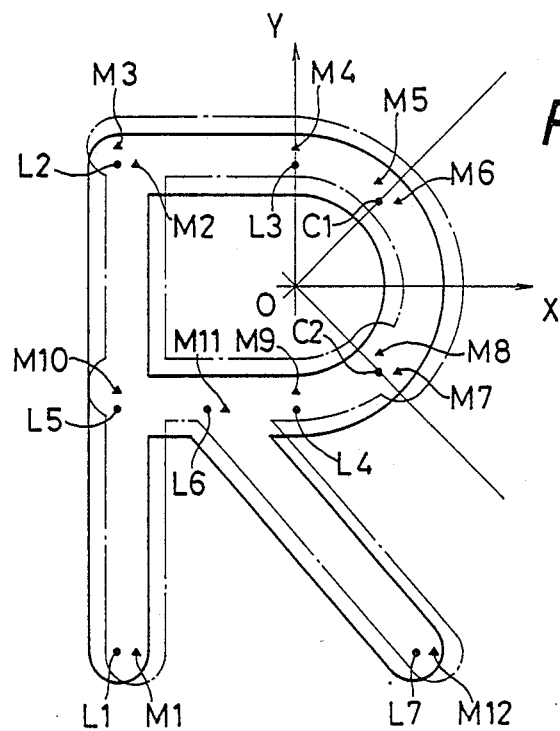

After a tracing operation of the segment L2L3, the segment between points L3 and L4 is subsequently traced. Since this segment is a circular arc, the judgment in step S207 is affirmative (YES), and the CPU 160 goes to step S215. In this step, as illustrated in FIG. 9(b), the CPU 160 translates the X-Y coordinate system of FIG. 5(a) such that the origin of the system is located on the center of the arc $P_1P_2$ (arc L3L4). On the system, the arc L3L4 is divided into three arcs L3C1, C1C2 and C2L4, with the borderlines, $Y=X$ and $Y=-X$. The present point and destination point about each of the thus obtained division arcs will be represented by "$R_1(X_3, Y_3)$" and "$R_2(X_4, Y_4)$", respectively. For the division arc L3C1, point L3 is present point $R_1$ while point C1 is destination point $R_2$. In the next step S216 (FIG. 8A), the CPU 160 checks if the division arc L3C1 as the first one to be erased exists within the region A of the X-Y coordinate system. In this connection, the checking of step S216 may be performed by other methods. For example, the checking may be conducted by judging whether or not the straight line (previously identified as "central line") connecting the center of the arc and the middle point of same is contained in the region A. Since the division arc L3C1 is within the region B, the checking in step S216 is negative (NO), and the CPU 160 goes to step 218. In this step, the CPU 160 adds the value h to the Y coordinate of each of points $R_1(X_3, Y_3)$ and $R_2(X_4, Y_4)$ to obtain points $Q_3(X_3, Y_3+h)$ and $Q_4(X_4, Y_4+h)$. These points $Q_3$ and $Q_4$ correspond to points M4 and M5 of the character "R", respectively, which indicates that points L3 and C1 are moved upward as seen in FIG. 9(b), i.e., in the positive direction of the Y-axis.

Step S218 is followed by step S219 wherein the CPU 160 causes the erasing pen 46 to move to point $Q_3$ (point M4). In this case, however, the erasing pen 46 has been at point M4, and the pen 46 does not move in fact. Subsequently, the CPU 160 enters step S220 to cause the erasing pen 46 to trace between points $Q_3$ and $Q_4$ (points M4 and M5) by circling about the center (origin) O. In the step S221, the CPU 160 judges whether there remains another destination point. Since point C2 is given, the judgment in step S221 is affirmative (YES). Hence, the CPU 160 returns to step S216.

Subsequently, the segment between points C1 and C2 is traced in the same process as the division arc L3C1, excluding step S216. Described in detail, the division arc C1C2 is contained in the region A and the check in step S216 is affirmative (YES). In next step S217, the CPU 160 shifts present point $R_1$ and destination point $R_2$ (points C1 and C2) into points $Q_3(X_3+h, Y_3)$ and $Q_4(X_4+h, Y_4)$. The thus obtained points $Q_3$ and $Q_4$ correspond to points M6 and M7, respectively. That is, points M6 and M7 are positioned apart from points C1 and C2 by the unit distance h. After completion of a tracing operation of the arc C2L4 (arc M8M9), the CPU 160 in step S221 provides a negative judgment (NO), and goes to step S214.

The operations for tracing the character "R" as described above are further repeated. After a tracing operation of a segment L6L7 with the erasing pen 46 is finished, the check in step S214 is negative (NO). The CPU 160 then enters step S222.

In the above-described first-time tracing operation, the erasing pen 46 traces over the area that is surrounded with the one-dot chain line as shown in FIG. 9(b) as a result of traveling from point to point in order of M1, M2, ..., M12.

Figure 9C:
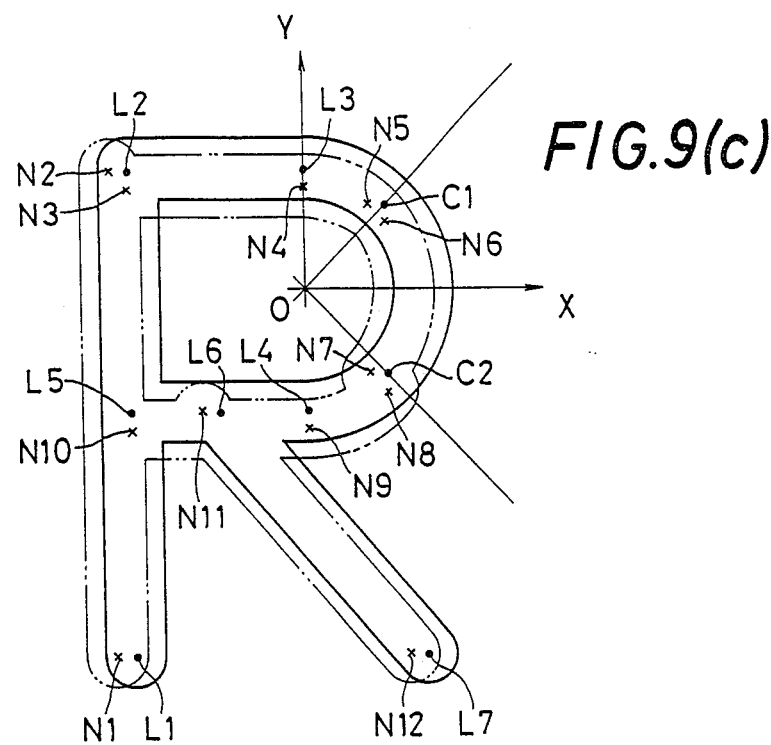

In step S222, the CPU 160 checks if the CPU 160 itself enters this step for the second time. Since in this case it is for the first time, the result of the check in step S222 is negative (NO). Then, the CPU 160 goes to step S223 to count a SECOND TIME, and returns to step S201. In step S201, the judgment of the CPU 160 is affirmative (YES), because it is for the second time. Then, the CPU 160 goes to step S203 to select $-1$ as the unit distance "h", and executes a second-time tracing operation like the first-time one except that the the value "$-1$" is used as the unit distance for the second-time tracing. Consequently, as shown in FIG. 9(c), the erasing pen 46 traces the area surrounded by the two-dot chain line as a result of movement of the pen 46 from point to point in sequence of N1, N2, ..., N12.

After completion of a second-time tracing operation of the segment L6L7, the CPU 160 in step S222 produces an affirmative judgment (YES), and goes to step S224 to cause the writing pen 46 to move into the printing position, in place of the erasing pen 46. The CPU 160 further enters step S225 wherein it causes the writing pen 46 (carriage 36) to move to the next position in which there are again conducted the operations corresponding to the main routine of the flow chart in FIG. 6, under control of the CPU 160.

Also in the manual ERASING mode, a written character is erased in the same manner as that in the automatic ERASING mode described above.

Figure 9D:
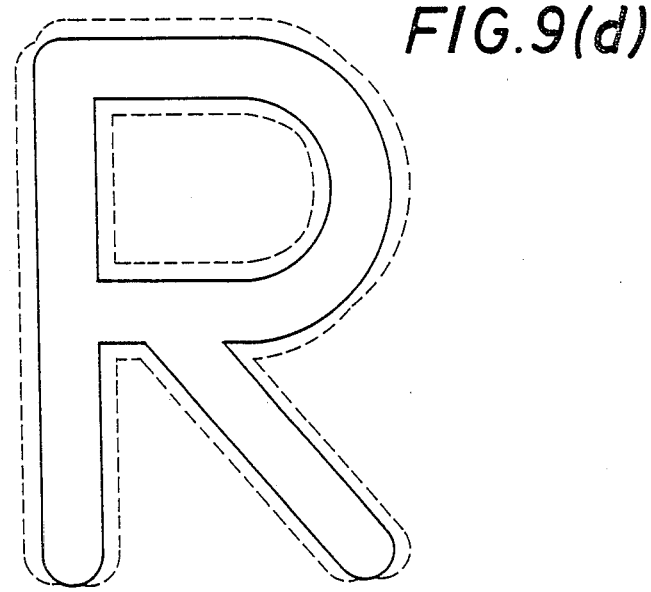

The area that is traced with the erasing pen 46 by means of the first- and second-time tracings is indicated with the broken line as shown in FIG. 9(d). As is apparent from the figure, the area surrounded with the broken line covers the written character "R" while allowing a suitable margin.

In this way, the first aspect of the present invention has been described in detail with reference to its preferred embodiment, but it may be otherwise embodied.

While the above embodiment utilizes a pair of straight lines represented by respective equations, $Y=X$ and $Y=-X$, for the borderlines that divide the X-Y coordinate system into the region A and region B, other pairs of lines may be employed.

Futhermore, while in the present embodiment the X and Y axes are utilized as a first and a second reference lines for the erasing operation, there may be used other lines for such reference lines. For instance, a line inclined with respect to the X-axis is preferably employed in place of the Y-axis in the case of erasing italic letters. More specifically described, the line having the same inclination as that of the italics is preferable as a reference line to the Y-axis normal to the remaining reference line X-axis.

Also, in the above embodiment, the tracing operation is conducted two times. However, it is advantageous to conduct the tracing operation three times by adding to the above-described two-time tracing operations one more time in which the pen 46 traces a written character as conventional recording devices do, i.e., without shifting the erasing path of the pen 46. With the three-time tracing operations, the written character can be erased with higher certainty or reliability.

Moreover, if the operations for erasing a character are executed using the writing pen 46 in place of the erasing pen 46, in the ERASING mode on the instant apparatus, there can be written a boldface character which has thicker segments than those of a character written in the WRITING mode (see FIG. 9(d).

Figure 10:
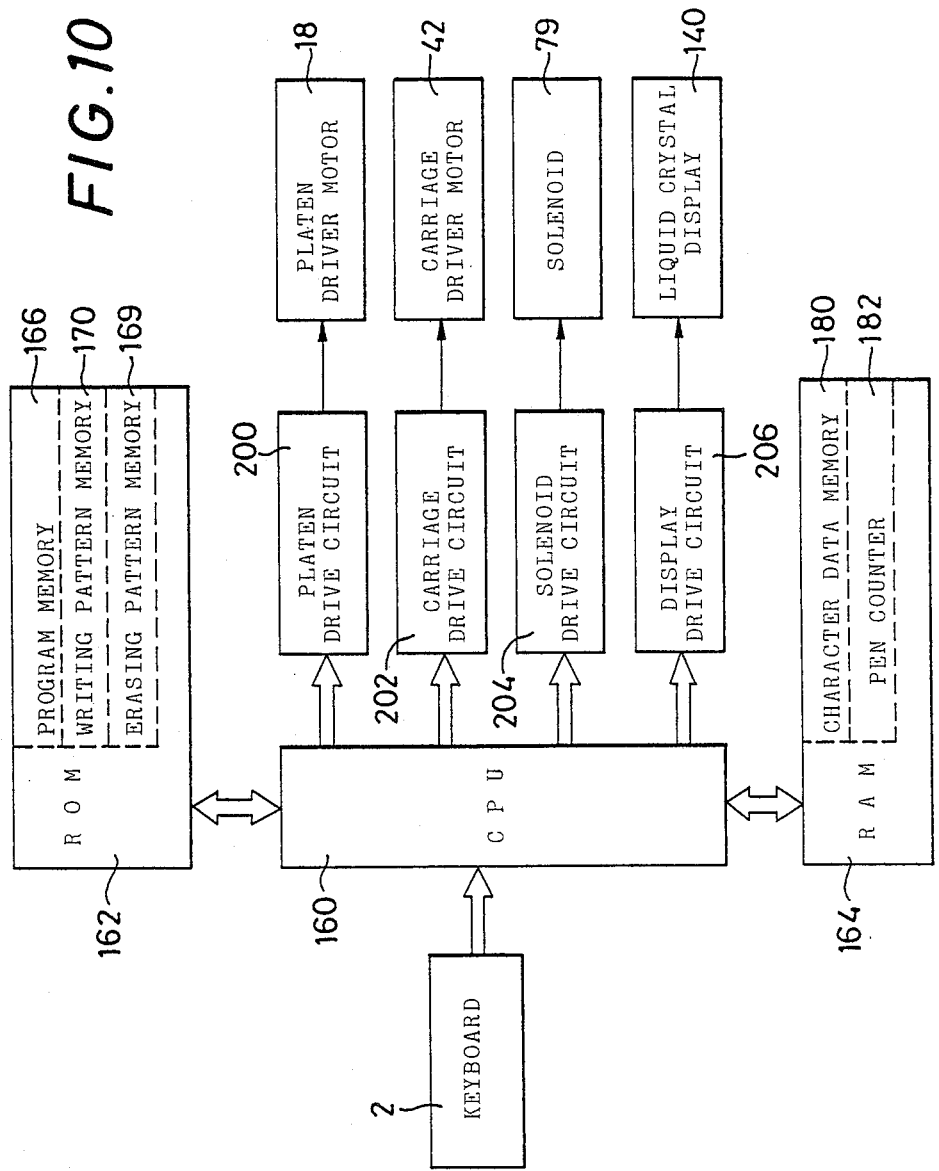
FIG. 10 is a block diagram of one embodiment of a recording apparatus according to another aspect of the invention, corresponding to FIG. 4.
Figure 11A:
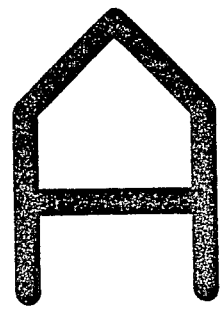
FIGS. 11(a) and (b) show a character "A" written using a conventional recording device and a tracing for erasing the written character "A" with the same, respectively.
Figure 11B:
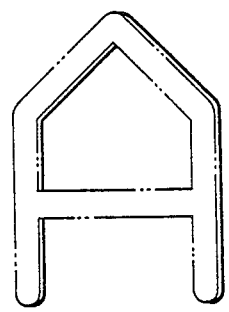

Referring next to FIG. 10, there will be described an embodiment of a recording apparatus according to another aspect of the invention.

The instant embodiment is substantially similar to the previously described embodiment according to the first aspect of the invention, except for a writing pattern memory 170 and an erasing pattern memory 169, and therefore the remaining members of the former embodiment will be referred to with the same designations and numerals as those of corresponding members of the latter embodiment.

The character pattern memory 170 stores sets of writing pattern data corresponding to all of the characters and symbols that can be keyed in via a keyboard 2. The erasing pattern memory 169 stores sets of erasing pattern data that correspond to the sets of writing pattern data stored in the writing pattern memory 170.

A set of erasing pattern data of a character that is stored in the erasing pattern memory 169 corresponds to the set of writing pattern data of the character that is stored in the writing pattern memory 170. A tracing operation of each segment that partially constitutes a written character is conducted under commands of the set of erasing pattern data of the character. That is, each component of an erasing path of the erasing pen 46 is shifted by a predetermined distance both in one of opposite directions and in the other direction from the segment. In this connection, as previously described in detail, it is recommended to employ the X-Y coordinate system of FIG. 5(a) on a sheet of paper 28 retained on a platen 12 such that the system may be translated with respect to the X- and Y-axes of the recording arrangement, i.e., the line of movement of a carriage 36 and the line of feed of the sheet 28, and utilize the X-axis and Y-axis as reference lines for erasing a written character with higher reliability. The coordinate system of FIG. 5(a) is divided into four divisions by a pair of straight lines, $Y=X$ and $Y=-X$, and a pair of opposite divisions containing the X-axis is defined as "region A" while the remaining two divisions containing the Y-axis as "region B". A straight segment which lies in the region A when the origin of the system is positioned on any point of the segment, is traced at respective positions spaced from the segment by a predetermined distance in opposite directions along the Y-axis, and on the other hand a straight segment which lies in the region B is traced at respective positions spaced by the predetermined distance in opposite directions along the X-axis. On the contrary, a circular arc segment which lies in the region A is traced at respective positions spaced from the written arc by the predetermined distance in opposite directions along the X-axis while an arc in the region B is traced at respective positions spaced apart by the predetermined distance in opposite directions along the Y-axis.

There will be discussed operations of the instant embodiment.

In a WRITING mode, a CPU 160 retrieves a set of writing pattern data corresponding to a character to be written from the writing pattern memory 170, and causes a platen drive motor 18, carriage drive motor 42, solenoid 79 and other members to be actuated. Then, the character is written in the same manner as illustrated in FIG. 9(a).

In an ERASING mode for erasing a written character, the CPU 160 first retrieves a set of erasing pattern data corresponding to a character to be erased, from the erasing pattern memory 169. In the case of a character "R", for example, the set of erasing pattern data includes data about positions of points M1, M2, ..., M12 and N1, N2, ..., N12 as shown in FIGS. 9(b) and 9(c). The area surrounded by the broken line shown in FIG. 9(d) indicates a tracing of the character "R" as a result of traveling of the erasing pen 46 in the order of points M1, M2, ..., M12 and N1, N2, ..., N12. The area overlaps the character "R" while leaving an effective margin.

In the above-described preferred embodiment according to the second aspect of the invention, another pair of reference lines may be used in place of the X- and Y-axes of the coordinate system, i.e., of the recording apparatus.

If a circular arc of a character bridges the regions A and B over the borderline by a short distance, the set of pattern data corresponding to the character may be adapted to be stored in the erasing pattern memory 169 in a manner in which the short-distance part of the arc is integral with the remaining part of same, i.e., in which the short-distance part is in the same region as the remaining one.

While the present invention has been described in its preferred embodiments, it is to be understood that the invention is not limited thereto, but may be otherwise embodied with various changes, modifications and improvements in the keyboard, recording mechanism, control system and control programs, which may occur to those skilled in the art in the light of foregoing teachings, and which do not exceed the scope of the invention as expressed in the appended claims.

What is claimed is:

1. A recording apparatus capable of writing characters on a recording medium with a writing instrument, and erasing written characters with an erasing instrument, comprising:

a medium support member for supporting said recording medium;

medium feeding means for feeding said recording medium supported by said medium support member, in a selected one of opposite directions along a line of feed;

a carriage for supporting said writing and erasing instruments, said carriage being movable in a selected one of opposite directions perpendicular to said line of feed of said recording medium;

carriage driving means for moving said carriage;

instrument selecting means for selectively bringing said writing and erasing instruments into an operative position in which a writing end of said writing instrument or an erasing end of said erasing instrument is located opposite to a surface of said recording medium;

instrument driving means for moving said writing and erasing instruments into said operative position, between an advanced position and a retracted position, for contact and release of said writing and erasing ends with or from said surface of said recording medium;

a generator for producing character signals indicative of said characters, and an erasing signal commanding an erasing operation of said erasing instrument;

a pattern memory for storing sets of character pattern data representative of said characters;

first control means, responsive to a character signal produced by said generator, for retrieving from said pattern memory a corresponding one of said sets of character pattern data, and controlling the operations of said medium feeding means, said carriage driving means, and said instrument driving means, according to the retrieved set of character pattern data, so as to write on said recording medium with said writing instrument the character represented by said retrieved set of character pattern data; and second control means, responsive to said erasing signal produced after said character has been written, including (a) retriveing means for retrieving from said pattern memory the set of character pattern data representative of said character, (b) judging means for determining whether a segment of said character corresponding to each of components of an erasing path of said erasing instrument is positioned nearer to a first reference line or to a second reference line, said first and second reference lines intersecting each other, and (c) modifying means for modifying said retrieved set of character pattern data into said corresponding set of erasing pattern data such that said set of erasing pattern data causes said each component of said erasing path to be shifted in a first direction normal to said first reference line if said judging means has determined that said segment is positioned nearer to said first reference line than to said second reference line, or in a second direction normal to said second reference line if said judging means has determined that said segment is positioned nearer to said second reference line than to said first reference line, said second control means controlling the operations of said medium feeding means, said carriage driving means, and said instrument driving means, according to said set of erasing pattern data, so as to trace said character along said erasing path with said erasing instrument.

2. A recording apparatus as set forth in claim 1, wherein said first reference line is a Y axis parallel to said line of feed, while said second reference line is an X axis parallel to a line of movement of said carriage.

3. A recording apparatus as set forth in claim 2, wherein when said segment of said character is a straight segment, said second control means judges whether said straight segment is nearer to said X axis or to said Y axis by checking if an absolute value of a slope of said straight segment is greater than 1 or not in a coordinate system defined by said X and Y axes.

4. A recording apparatus as set forth in claim 2 wherein when said segment of said character is a circular arc, said second control means makes a first judgment that said circular arc is nearer to said X axis than to said Y axis if a straight line passing a center and a midpoint of said circular arc is nearer to said X axis, and a second judgment that said circular arc is nearer to said Y axis if said straight line is nearer to said Y axis.

5. A recording apparatus as set forth in claim 4, wherein, when said circular arc stretches over more than one of four divisions of an X-Y coordinate system in which an intersection of said X and Y axes is located on said center of said circular arc and which is divided into said four divisions by two straight lines represented by respective equations $Y=X$ and $Y=-X$, said second control means makes said first and second judgments for each of divided parts of said circular arc which lie in the corresponding divisions of said X-Y coordinate system.

6. A recording apparatus as set forth in claim 1, wherein said second control means modifies said retrieved set of character pattern data into a first set of erasing pattern data for shifting said each component of said erasing path of said erasing instrument by a predetermined distance to one side of the corresponding segment of said character, and a second set of erasing pattern data for shifting said each component of said erasing path by said predetermined distance to the other side of said corresponding segment of said character, said second control means controlling said medium feeding means, said carriage driving means, and said instrument driving means, according to said first and second sets of erasing pattern data, to trace said character two times with said erasing said erasing path to both sides of the individual segments of said character.

7. A recording apparatus as set forth in claim 1, wherein said second control means modifies said retrieved set of character pattern data into a first set of erasing pattern data for shifting said each component of said erasing path of said erasing instrument by a predetermined distance to one side of the corresponding segment of said character, and a second set of erasing pattern data for shifting said each component of said erasing path by said predetermined distance to the other side of said corresponding segment of said character, said second control means controlling said medium feeding means, said carriage driving means, and said instrument driving means, according to said retrieved set of character pattern data and according to said first and second sets of erasing pattern data, to trace said character three times with said erasing instrument.

8. A recording apparatus as set forth in claim 1, wherein said generator produces a boldface signal which causes said instrument selecting means to bring said writing instrument into said operative position, said boldface signal causing said second control means to control said medium feeding means, said carriage driving means, and said instrument driving means, according to said set of erasing pattern data in place of the corresponding set of character pattern data, to write said character with a larger thickness than that of the character to be written according to said corresponding set of character pattern data under the control of said first control means.

9. A recording apparatus as set forth in claim 1, wherein said first and second control means comprise a computer.

10. A recording apparatus capable of writing characters on a recording medium with a writing instrument, and erasing written characters with an erasing instrument, comprising:
   a medium support member for supporting said recording medium;
   medium feeding means for feeding said recording medium supported by said medium support member, in a selected one of opposite directions along a line of feed;
   a carriage for supporting said writing and erasing instruments, said carriage being movable in a selected one of opposite directions perpendicular to said line of feed of said recording medium;
   carriage driving means for moving said carriage perpendicularly to said line of feed;
   instrument selecting means for selectively bringing said writing and erasing instruments into an operative position in which a writing end of said writing instrument or an erasing end of said erasing instrument is located opposite to a surface of said recording medium;
   instrument driving means for moving said writing and erasing instruments into said operative position, between an advanced position and a retracted position, for contact and release of said writing and erasing ends with or from said surface of said recording medium;
   a generator for producing character signals indicative of said characters, and an erasing signal commanding an erasing operation of said erasing instrument;
   a character pattern memory for storing sets of character pattern data representative of said characters;
   an erasing pattern memory for storing sets of erasing pattern data corresponding to said sets of character pattern data, for erasing said characters, each of said sets of erasing pattern data permitting each of components of an erasing path of said erasing instrument to be shifted from said character in a selected one of a first and a second direction which are normal to a first and a second reference line, respectively, which first and second reference lines intersect each other, said set of erasing pattern data causing said each component of said erasing path to be shifted in said first direction if a segment of said character corresponding to the component is positioned nearer to said first reference line than to said second reference line, or to be shifted in said second direction if said segment is positioned nearer to said second reference line than to said first reference line; and
   control means responsive to a character signal produced by said generator, for retrieving from said character pattern memory a corresponding one of said sets of character pattern data, and controlling the operations of said medium feeding means, said carriage driving means, and said instrument driving means, according to the retrieved set of character pattern data, so as to write on said recording medium with said writing instrument the character represented by said retrieved set of character pattern data,
   said control means being responsive to said erasing signal produced after said character has been written, to retrieve from said erasing pattern memory the set of erasing pattern data corresponding to said retrieved set of character pattern data, said control means controlling the operations of said medium feeding means, said carriage driving means, and said instrument driving means, according to the retrieved set of erasing pattern data, so as to trace said character along said erasing path with said erasing instrument.

11. A recording apparatus as set forth in claim 10, wherein said first reference line is a Y axis parallel to said line of feed, while said second reference line is an X axis parallel to a line of movement of said carriage.

12. A method of erasing a character which has been written on a recording medium with a writing instrument of a recording apparatus according to a set of character pattern data which is stored in a pattern memory and is representative of the character, said method comprising the steps of:
   retrieving from a pattern data memory said set of character pattern data;
   determining whether a segment of the written character corresponding to each of components of an erasing path of an erasing instrument is positioned nearer to a first reference line or to a second reference line, said first and second reference lines intersecting each other;
   modifying the retrieved set of character pattern data into a corresponding set of erasing pattern data such that said corresponding set of erasing pattern data causes said each component of said erasing path to be shifted from said written character in a first direction normal to said first reference line if said segment of said written character is positioned nearer to said first reference line than to said second reference line, or in a second direction normal to said second reference line if said segment is positioned nearer to said second reference line than to said first reference line; and
   controlling movements of said erasing instrument and said recording medium according to said corresponding set of erasing pattern data, to trace said written character along said erasing path.

13. A recording apparatus capable of writing characters on a recording medium with a writing instrument, and erasing written characters with an erasing instrument, comprising:
   a medium support member for supporting said recording medium;

medium feeding means for feeding said recording medium supported by said medium support member, in a selected one of opposite directions along a line of feed;

a carriage for supporting said writing and erasing instruments, said carriage being movable in a selected one of opposite directions perpendicular to said line of feed of said recording medium;

carriage driving means for moving said carriage;

instrument selecting means for selectively bringing said writing and erasing instruments into an operative position in which a writing end of said writing instrument or an erasing end of said erasing instrument is located opposite to a surface of said recording medium;

instrument driving means for moving said writing and erasing instruments into said operative position, between an advanced position and a retracted position, for contact and release of said writing and erasing ends with or from said surface of said recording medium;

a generator for producing character signals indicative of said characters, and an erasing signal commanding an erasing operation of said erasing instrument;

a pattern memory for storing sets of character pattern data representative of said characters;

first control means, responsive to a character signal produced by said generator, for retrieving from said pattern memory a corresponding one of said sets of character pattern data, and controlling the operations of said medium feeding means, said carriage driving means, and said instrument driving means, according to the retrieved set of character pattern data, so as to write on said recording medium with said writing instrument the character represented by said retrieved set of character pattern data; and second control means, responsive to said erasing signal produced after said character has been written, including (a) retrieving means for retrieving from said pattern memory the set of character pattern data representative of said character, (b) judging means for determining whether a segment of said character corresponding to each of components of an erasing path of said erasing instrument is positioned nearer to a Y axis parallel to said line of feed of said recording medium or nearer to an X axis parallel to a line of movement of said carriage, and (c) modifying means for modifying the retrieved set of character pattern data into a corresponding set of erasing pattern data such that said set of erasing pattern data causes said each component of said erasing path to be shifted in a first direction normal to said Y axis if said judging means has determined that said segment is positioned nearer to said Y axis than to said X axis, or in a second direction normal to said X axis if said judging means has determined that said segment is positioned nearer to said X axis than to said Y axis;

said corresponding set of erasing pattern data comprising first erasing pattern data for shifting said each component of said erasing path by a predetermined distance to one side of the corresponding segment of said character, and second erasing pattern data for shifting said each component of said erasing path by said predetermined distance to the other side of said corresponding segment of said character, said second control means controlling the operations of said medium feeding means, said carriage driving means, and said instrument driving means, according to said first erasing pattern data and said second erasing pattern data, so as to trace said character two times along said erasing path with said erasing instrument.

* * * * *